(12) United States Patent
Kawamura

(10) Patent No.: US 7,606,477 B2
(45) Date of Patent: Oct. 20, 2009

(54) ELECTRONIC CAMERA

(75) Inventor: Tomoaki Kawamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 327 days.

(21) Appl. No.: 11/355,963

(22) Filed: Feb. 17, 2006

(65) Prior Publication Data

US 2006/0216009 A1 Sep. 28, 2006

(30) Foreign Application Priority Data

Mar. 25, 2005 (JP) .............................. 2005-088771
Jan. 6, 2006 (JP) .............................. 2006-001708

(51) Int. Cl.
*G03B 17/00* (2006.01)

(52) U.S. Cl. .......................... 396/55; 396/129; 396/279

(58) Field of Classification Search .................... 396/55, 396/129, 279

See application file for complete search history.

(56) References Cited

U.S. PATENT DOCUMENTS

| 4,023,188 | A | * | 5/1977 | Ueda et al. .................. 396/162 |
| 5,175,580 | A | | 12/1992 | Shiomi |
| 5,805,945 | A | * | 9/1998 | Aoki .......................... 396/429 |
| 5,867,213 | A | | 2/1999 | Ouchi |
| 6,573,930 | B2 | | 6/2003 | Kyuma et al. |
| 2001/0022619 | A1 | * | 9/2001 | Nishiwaki ................... 348/208 |
| 2001/0033331 | A1 | | 10/2001 | Eto et al. |
| 2004/0136704 | A1 | | 7/2004 | Usui |

FOREIGN PATENT DOCUMENTS

| JP | 06-019593 | * | 7/1992 |
| JP | A 07-123317 | | 5/1995 |
| JP | A 10-42188 | | 2/1998 |
| JP | 2003-088110 | * | 3/2003 |
| JP | A-2003-259194 | | 9/2003 |

* cited by examiner

*Primary Examiner*—Rochelle-Ann J Blackman
*Assistant Examiner*—Michael A Strieb
(74) *Attorney, Agent, or Firm*—Oliff & Berridge, PLC

(57) ABSTRACT

An electronic camera includes: an image-capturing unit including an image-capturing device and an image-capturing optical system; a blur detecting unit; a moving unit moving part or all of the image-capturing unit to eliminate the blur according to the detection result; a reading unit reading the image from the image-capturing device; a viewfinder displaying unit continuously displaying the image read; an operating unit accepting a user instruction; and a controlling unit performing, when the start of photographing is not instructed, electronic blur correction by controlling the reading unit to continuously change an image-capturing range of the image-capturing device or continuously changing a range of the image read to be displayed on the viewfinder displaying unit, and ends, when it is instructed, the electronic blur correction and performs optical blur correction by controlling the moving unit. Accordingly, appropriate blur correction is feasible with an increase in power consumption suppressed.

1 Claim, 2 Drawing Sheets

A

B

C

ELECTRONIC CAMERA

CROSS REFERENCE TO RELATED APPLICATION

This application is based upon and claims the benefit of priority from Japanese Patent Application No. 2005-88771, filed on Mar. 25, 2005 and No. 2006-1708, filed on Jan. 6, 2006, the entire contents of which are incorporated herein by reference.

BACKGROUND OF THE INVENTION

1. Field of the Invention

The present invention relates to an electronic camera which captures a subject figure and generates an image, and particularly relates to an electronic camera having a blur-correcting function.

2. Description of the Related Art

An electronic camera which corrects a blur of an optical axis in an image-capturing optical system is conventionally known. Such an electronic camera corrects the blur by physically moving a part of the image-capturing optical system or an image-capturing device (or a film). Further, there is another known electronic camera which corrects the blur using an image processing technique, by combining plural images generated by image capturing with separate exposure or shifting an image-capturing range (for example, disclosed in Japanese Unexamined Patent application Publication No. Hei 7-123317).

However, the above-described device correcting the blur by physically moving a part of the image-capturing optical system or the image-capturing device (or the film) needs to have an optical system suitable for blur correction and drive it, which raises a problem of drastically increasing power consumption. Further, in the above-described electronic camera correcting the blur using the image processing technique, various problems may occur such as image degradation, image size reduction, lack of image information, and so on.

SUMMARY OF THE INVENTION

An object of the present invention is to provide an electronic camera which can realize appropriate blur correction while suppressing an increase in power consumption.

To attain the above-described object, an electronic camera of the present invention includes an image-capturing unit which includes an image-capturing device capturing a subject figure to generate an image and an image-capturing optical system focusing the subject figure onto the image-capturing device; a blur detecting unit which detects a blur of an optical axis in the image-capturing optical system; a moving unit which moves part or all of the image-capturing unit so as to eliminate the blur, according to a result of the detection by the blur detecting unit; a reading unit which reads the image from the image-capturing device; a viewfinder displaying unit which continuously displays the image read by the reading unit; an operating unit which receives a user instruction on a start of photographing; and a controlling unit which performs, when the operating unit has not instructed the start of photographing, electronic blur correction by controlling the reading unit to continuously change an image-capturing range of the image-capturing device or continuously changing a range of the image read by the reading unit to be displayed on the viewfinder displaying unit. When the operating unit has instructed the start of photographing, the controlling unit ends the electronic blur correction and performs optical blur correction by controlling the moving unit.

Preferably, the operating unit may include a release button which has three operational states of off, half-pressed, and fully-pressed, and the controlling unit may perform the electronic blur correction when the release button is in the off state, upon determining that the start of photographing is not to be instructed, and perform the optical blur correction when the release button is in the half-pressed or fully-pressed state, upon determining that the start of photographing has been instructed.

Preferably, the controlling unit may control the reading unit such that the image range displayed on the viewfinder displaying unit during the electronic blur correction substantially coincides with the image-capturing range of the image-capturing device during the optical blur correction.

Another electronic camera of the present invention includes an image-capturing unit which includes an image-capturing device capturing a subject figure to generating an image and an image-capturing optical system focusing the subject figure onto the image-capturing device; a blur detecting unit which detects a blur of an optical axis in the image-capturing optical system; a moving unit which moves part or all of the image-capturing unit so as to eliminate the blur, according to a result of the detection by-the blur detecting unit; a reading unit which reads the image from the image-capturing device; a viewfinder displaying unit which continuously displays the image read by the reading unit; a detecting unit which detects a remaining power of a battery supplying electronic power to the electronic camera; and a controlling unit which performs one of electronic blur correction and optical blur correction according to a result of the detection by the detecting unit. The electronic blur correction is made by controlling the reading unit to continuously change an image-capturing range of the image-capturing device or by continuously changing a range of the image read by the reading unit to be displayed on the viewfinder displaying unit, and the optical blur correction is made by controlling the moving unit.

Another electronic camera of the present invention includes: an image-capturing unit which includes an image-capturing device capturing a subject figure to generate an image and an image-capturing optical system focusing the subject figure onto the image-capturing device; a blur detecting unit which detects a blur of an optical axis in the image-capturing optical system; a moving unit which moves part or all of the image-capturing unit so as to eliminate the blur, according to a result of the detection by the blur detecting unit; a reading unit which reads the image from the image-capturing device; a viewfinder displaying unit which continuously displays the image read by the reading unit; an identifying unit which identifies a kind of a power source supplying electronic power to the electronic camera; and a controlling unit which performs one of electronic blur correction and optical blur correction according to a result of the identification by the identifying unit. The electronic blur correction is made by controlling the reading unit to continuously change an image-capturing range of the image-capturing device or to continuously change a range of the image read by the reading unit to be displayed on the viewfinder displaying unit, and the optical blur correction is made by controlling the moving unit.

BRIEF DESCRIPTION OF THE DRAWINGS

The nature, principle, and utility of the invention will become more apparent from the following detailed descrip

DESCRIPTION OF THE PREFERRED EMBODIMENT

The best mode for carrying out the present invention will be described below with reference to the drawings.

Figure 1:
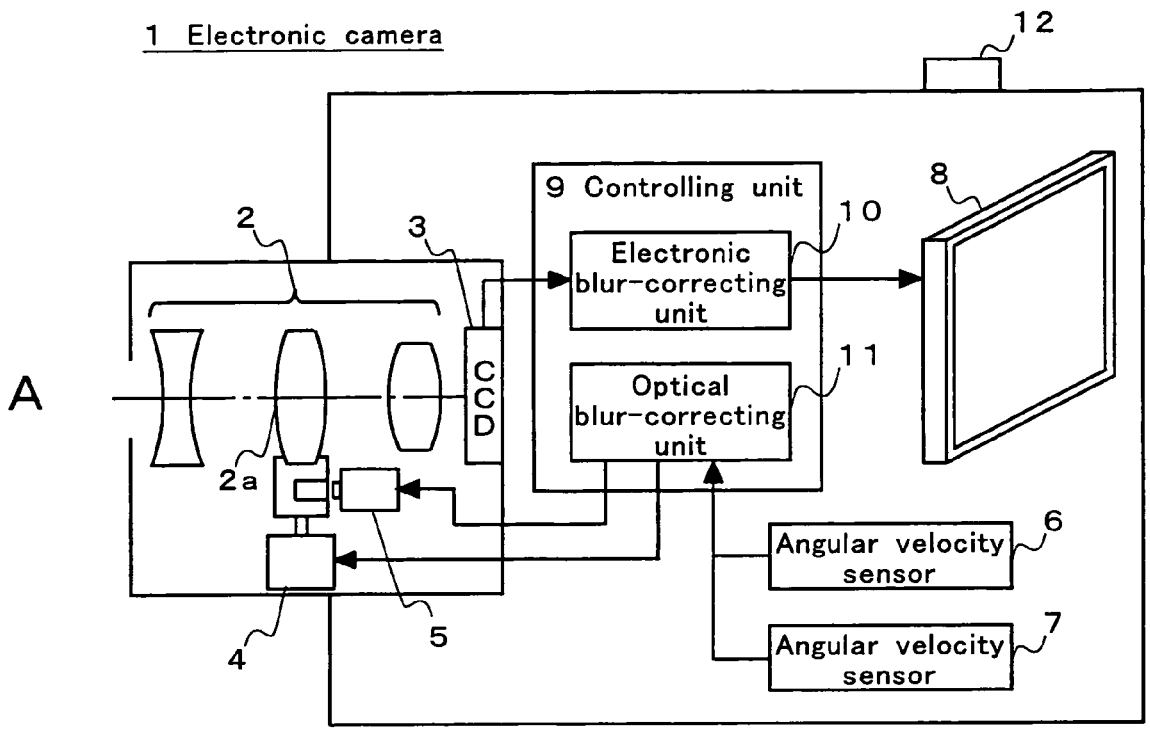
- FIG. 1A to FIG. 1C are diagrams showing the configuration of an electronic camera 1.
Figure 1:
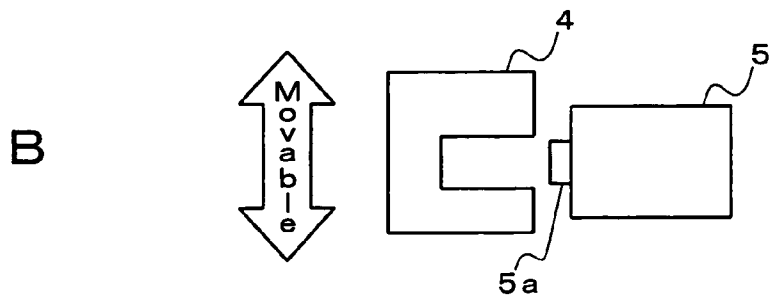
Figure 1:
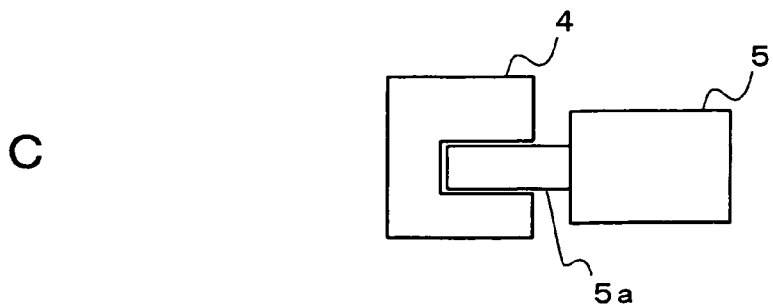

As shown in FIG. 1A, an electronic camera 1 of the present embodiment includes an image-capturing optical system 2 composed of plural lenses, a CCD (Charge Coupled Device) 3, a lens driving unit 4 which moves a shift-lens 2a being part of the image-capturing optical system 2, a lens locking unit 5 to restrict driving of the lens driving unit 4, an angular velocity sensor 6 and an angular velocity sensor 7 which detect a blur of an optical axis in the image-capturing optical system 2 in the form of angular velocity, an electronic viewfinder 8 which displays an image captured by the CCD 3, and a controlling unit 9 which controls the respective units. The controlling unit 9 includes an electronic blur-correcting unit 10 which performs electronic blur correction and an optical blur-correcting unit 11 which performs optical blur correction which will be described later. Further, the electronic camera 1 includes a release button 12 which accepts a user instruction regarding an instruction on the start of photographing. The controlling unit 9 determines the state of the release button 12 from off, half-pressed, and fully-pressed.

The shift-lens 2a of the image-capturing optical system 2 is tilted or shifted on a plane perpendicular to the optical axis of the image-capturing optical system 2 by the lens driving unit 4. The CCD 3 captures an image and reads out the captured image in accordance with control by the controlling unit 9. The image read out from the CCD 3 is then supplied to the electronic blur-correcting unit 10. An output of the electronic blur-correcting unit 10 is continuously supplied to the electronic viewfinder 8. A user performs framing while viewing the electronic viewfinder 8.

The angular velocity sensor 6 and the angular velocity sensor 7 detect angular velocities in different directions and supply detected results to the optical blur-correcting unit 11. The optical blur-correcting unit 11 performs optical blur correction by controlling the lens driving unit 4 according to the angular velocities supplied from the angular velocity sensor 6 and the angular velocity sensor 7. When not performing or ending the optical blur correction, the optical blur-correcting unit 11 controls the lens locking unit 5 to restrict the driving of the lens driving unit 4. The lens locking unit 5 includes a locking pin 5a as shown in FIG. 1B and FIG. 1C, and this locking pin 5a can be put into and taken out of a recessed portion of the lens driving unit 4. When performing the optical blur correction, as shown in FIG. 1B, the optical blur-correcting unit 11 does not insert the locking pin 5a into the lens driving unit 4 (an unlocked state), and when not performing the optical blur correction, as shown in FIG. 1C, it inserts the locking pin 5a into the lens driving unit 4 to thereby restrict the driving of the lens driving unit 4 (an locked state) and turn off the power to the lens driving unit 4 and the lens locking unit 5. Note that turning on/off of the optical blur correction may be realized by any other system such as a cam ring system in addition to this locking pin system.

Figure 2:
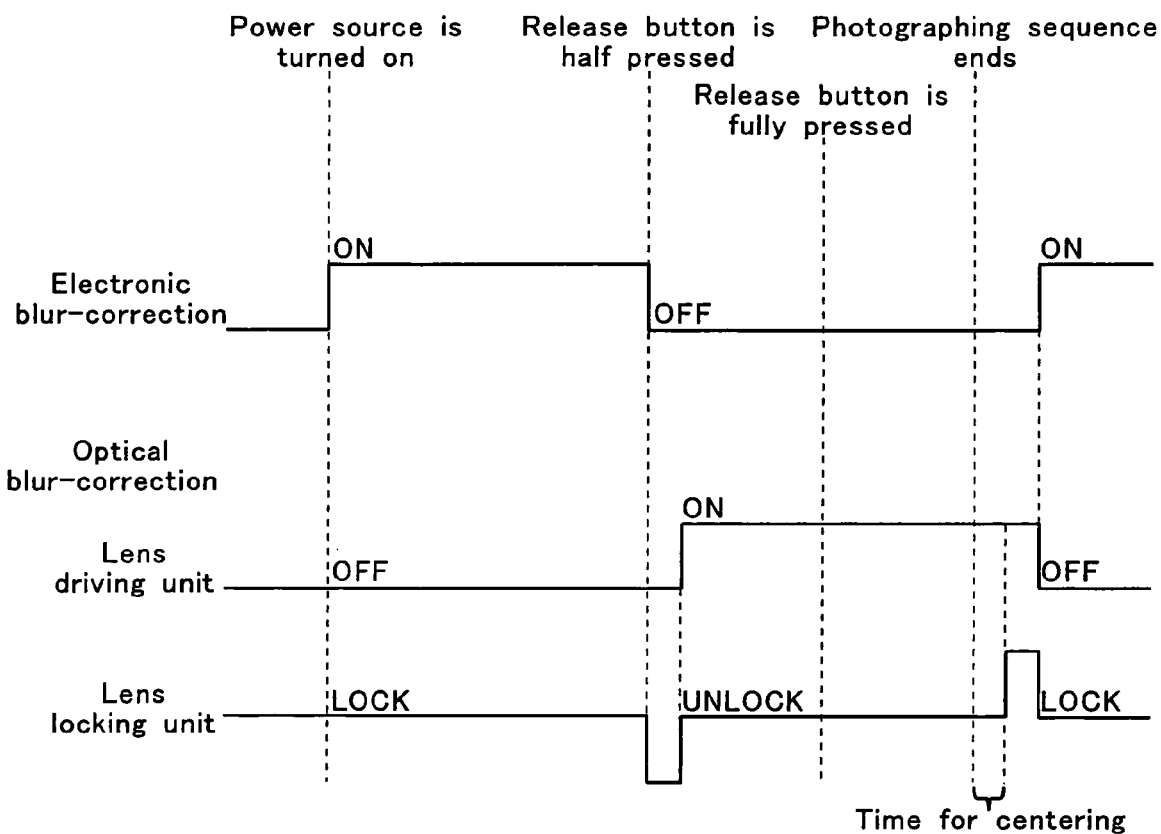
FIG. 2 is a timing chart showing the operation of the electronic camera 1.

The operation of the electronic camera 1 having the above-described configuration at the time of photographing will be described with reference to a timing chart in FIG. 2.

When a power source of the electronic camera 1 is turned on, the controlling unit 9 detects the power-on and performs the electronic blur correction via the electronic blur-correcting unit 10. The turn-on of the power and half press to the release button 12 means that the user is framing. In this state, the electronic camera 1 performs the electronic blur correction in order to facilitate framing while suppressing an increase in power consumption.

The electronic blur-correcting unit 10 cuts out a range slightly narrower than an actual image range in the image supplied from the CCD 3 and supplies it to the electronic viewfinder 8. The electronic blur-correcting unit 10 performs such image supply continuously to display a through image on the electronic viewfinder 8. Such display is performed, for example, at about 30 frames per second. When judging that a blur is occurring based on an image difference between frames (such as a contrast), the electronic blur-correcting unit 10 shifts the above-described cut out range (image range) vertically and horizontally so as to eliminate the blur. During such electronic blur correction, the lens driving unit 4 is in an off state, and the lens locking unit 5 is in the locked state.

Note that the electronic blur-correction unit 10 may perform the electronic blur correction by shifting a read out range (image-capturing range) when the image is read out from the CCD 3 vertically and horizontally according to the blur.

When the release button 12 is half pressed while the above-described electronic blur correction is performed, the controlling unit 9 detects the half press, ends the electronic blur correction via the electronic blur-correcting unit 10, and performs optical blur correction via the optical blur-correcting unit 11.

The optical blur-correcting unit 11 brings the lens locking unit 5 into the unlocked state to bring the lens driving unit 4 into an on-state and controls the lens driving unit 4 to drive the shift lens 2a according to the detected results of the angular velocity sensor 6 and the angular velocity sensor 7, thereby performing the optical blur correction.

When the release button 12 is fully pressed while the above-described optical blur correction is performed, the controlling unit 9 detects the full press and captures an image of a subject focused onto the CCD 3 via the image-capturing optical system 2. At this time, the image-capturing range of the CCD 3 is made nearly coincident with the above-described image range. When a photographing sequence ends, the optical blur-correcting unit 11 ends the optical blur correction by controlling the lens driving unit 4 to center the shift lens 2a to return it to an initial position and bringing the lens locking unit 5 to the locked state to bring the lens driving unit 4 into the off state, and starts again the above-described electronic blur correction in preparation for the next photographing.

As described above, since the electronic blur correction is always performed from the turning-on of the power source to the half-press to the release button 12, it is easy to perform framing even at photographing with a telephoto lens which often cause blurs and with low illumination. It is also possible to suppress an increase in power consumption to a minimum, reducing the influence on battery life. Further, with the half-press to the release button 12, the optical blur correction is performed so that a precise blur-correction is obtainable.

MODIFIED EXAMPLE

The above-described embodiment describes the example in which the electronic blur correction is performed until the half-press to the release button 12 with the increase in power consumption suppressed, and with the half-press to the release button 12, the high-precision optical blur correction is started. However, it may be modified as follows.

(1) The electronic blur correction is performed until the release button 12 is fully pressed.

Even when the release button 12 is half pressed, the electronic blur correction which suppresses the increase in power consumption is continued, and the high-precision optical blur correction is performed only after the release button 12 is fully pressed. This configuration can further suppress the increase in power consumption. The electronic camera is configured that the image range displayed on the electronic viewfinder 8 substantially coincides with the image-capturing range of the CCD 3 as described above. Accordingly, even when the electronic blur correction is switched to the optical blur correction due to the full-press to the release button 12, the angle of view does not change, giving no sense of incongruity to the user.

(2) Blur correction 1 is performed according to the battery remaining power of the electronic camera.

In the electronic camera 1, the battery remaining power is detected, and the blur correction is performed according to the detected remaining power. For example, while the battery remaining power is ample, the optical blur correction is continuously performed. When the battery remaining power has reduced, the optical blur correction is switched to the electronic blur correction.

(3) Blur correction 1 is performed according to the kind of the power source of the electronic camera.

In the electronic camera 1, the kind of the power source is identified, and the blur correction is performed according to the identified power source. For example, when the power source is an AC adaptor, the optical blur correction is always performed, and when the power source is a battery, the electronic blur correction is switched to the optical blur correction as described above. Further, when the capacity of the power source is sufficiently large, the optical blur correction is always performed, and when the capacity of the power source is small, the electronic blur correction is switched to the optical blur correction as described above. Furthermore, another kind of the battery may be added.

(4) Blur correction is performed according to the mode of the electronic camera 1.

When the electronic camera includes a power saving mode, for example, the electronic blur correction is switched to the optical blur correction at the turn-on of the power saving mode.

As described above, the present embodiment describes an electronic camera which includes an image-capturing unit which includes an image-capturing device capturing a subject figure and generating an image and an image-capturing optical system focusing the subject figure onto the image-capturing device, a blur detecting unit which detects a blur of an optical axis in the image-capturing optical system, a moving unit which moves, according to a result detected by the blur detecting unit, part or all of the image-capturing unit so as to eliminate the blur, a reading unit which reads out the image from the image-capturing device, a viewfinder displaying unit which continuously displays the image read out by the reading unit, and an operating unit which accepts a user instruction on the start of photographing. The electronic camera performs the electronic blur correction by controlling the reading unit to continuously change an image-capturing range of the image-capturing device, when the operating unit has not instructed the start of photographing, or by continuously changing a range of the image read out by the reading unit to be displayed on the viewfinder displaying unit. In contrast, when the operating unit has instructed the start of photographing, the electronic camera ends the electronic blur correction, and starts the optical blur correction by controlling the moving unit. Accordingly, the appropriate blur correction can be realized while the increase in power consumption is suppressed.

Further, according to the present embodiment, the above-described operating unit includes a release button which has three operational states of off, half-pressed, and fully-pressed. While the release button is in the off state, the electronic camera determines that the start of photographing is not to be instructed and performs the electronic blur correction. On the other hand, while the release button is half pressed or fully pressed, it determines that the start of photographing has been instructed and performs the optical blur correction. Accordingly, the appropriate blur correction can be realized with the increase in power consumption suppressed, by performing the low-power consumption electronic blur correction before the start of photographing and the high-precision optical blur correction after the start of photographing.

Furthermore, according to the present embodiment, the reading unit is controlled in such a manner that the image range displayed on the viewfinder display unit when the electronic blur correction is performed almost coincides with the image-capturing range of the image-capturing device when the optical blur correction is performed. Hence, it is possible to make coincident a field range displayed on the viewfinder displaying unit before the start of photographing, that is, during framing, with a field range in which the image is generated by image capturing.

Moreover, according to the present embodiment, the remaining power of the battery supplying electric power to the electronic camera is detected, and either the electronic blur correction or the optical blur correction is performed based on a detected result. Accordingly, appropriate blur correction can be realized according to the battery remaining power.

Moreover, according to the present embodiment, the kind of the power source which supplies electric power to the electronic camera is recognized, and based on a recognized result, either the electronic blur correction or the optical blur correction is performed. Accordingly, the appropriate blur correction can be realized according to the kind of the power source.

Note that the present embodiment describes the electronic camera 1 which generates a still image, but the present invention may be applied to an electronic camera which generates a moving image. When applying the present invention to the electronic camera which generates the moving image, the optical blur correction and the electronic blur correction may be used properly for still image photographing and moving image photographing. More specifically, the optical blur correction is performed at the time of still image photographing, and the electronic blur correction is performed at the time of moving image photographing. Using both blur corrections properly as just described enables power saving and noise reduction. This results in lengthening a maximum duration of shooting moving image. Additionally, at recording the shot moving image with voice, it is possible prevent noise from mixing into the voice.

Further, the present embodiment describes the example in which when the release button 12 is half pressed, the optical blur correction is performed. However, it is preferable that the angular velocity sensor 6 and the angular velocity sensor 7 be turned on to be in a standby state while the electronic blur correction is performed. With the need to suppress the increase in power consumption, they may be not set to the standby state and turned off even while the electronic blur correction is performed.

Furthermore, the present embodiment describes the example in which the optical blur correction is performed by shifting the shift lens 2a. However, the optical blur correction may be performed by tilting or shifting the CCD 3 in place of the shift lens 2a on the plane perpendicular to the optical axis of the image-capturing optical system 2. Moreover, the optical blur correction may be performed by incorporating the image-capturing optical system 2 and the CCD 3 into a single unit and tilting the entire unit.

The invention is not limited to the above embodiments and various modifications may be made without departing from the spirit and scope of the invention. Any improvement may be made in part or all of the components.

What is claimed is:

1. An electronic camera, comprising:

an image-capturing unit which includes an image-capturing device capturing a subject figure to generate an image and an image-capturing optical system focusing the subject figure onto said image-capturing device;

a blur detecting unit which detects a blur of an optical axis in said image-capturing optical system;

a moving unit which moves part or all of said image-capturing unit so as to eliminate the blur, according to a result the detection by said blur detecting unit;

a reading unit which reads the image from said image-capturing device;

a viewfinder displaying unit which continuously displays the image read by said reading unit;

an operating unit which receives a user instruction on a start of photographing;

a detecting unit which detects a remaining power of a battery supplying electronic power to said electronic camera;

an identifying unit which identifies a kind of a power source supplying electronic power to said electronic camera; and a controlling unit which performs one of electronic blur correction and optical blur correction according to a result of the identification by said identifying unit, the controlling unit always performing the optical blur correction when the power source is an AC adapter and performing one of the optical blur correction and the electronic blur correction when the power source is a battery by switching the optical blur correction and the electronic blur correction either according to a result detected by said detecting unit or depending on an existence of said user instruction in said operating unit, the electronic blur correction being made by controlling said reading unit to continuously change an image-capturing range of said image-capturing device or by continuously changing a range of the image read by said reading unit to be displayed on said viewfinder displaying unit, the optical blur correction being made by controlling said moving unit.

* * * * *